US012793043B2

(12) United States Patent
Liu et al.

(10) Patent No.: US 12,793,043 B2
(45) Date of Patent: Nov. 10, 2026

(54) IDENTITY ATTESTATION USING A TOKEN

(71) Applicant: Coinbase, Inc., Oakland, CA (US)

(72) Inventors: Siyu Liu, Palo Alto, CA (US); Anika Raghuvanshi, Beaverton, OR (US); Linwei Chen, New York City, NY (US); Paul Richard Gauvreau, Jr., San Francisco, CA (US); Alex Reeve, San Francisco, CA (US); Shenghu Yang, Mountain View, CA (US); Pinhua Chen, San Jose, CA (US); Akash Gaurav Shah, Millbrae, CA (US)

( * ) Notice: Subject to any disclaimer, the term of this patent is extended or adjusted under 35 U.S.C. 154(b) by 233 days.

(21) Appl. No.: 18/133,507

(22) Filed: Apr. 11, 2023

(65) Prior Publication Data

US 2024/0346481 A1 Oct. 17, 2024

(51) Int. Cl.
*G06Q 20/36* (2012.01)
*G06Q 20/40* (2012.01)
*H04L 9/32* (2006.01)

(52) U.S. Cl.
CPC ........... *G06Q 20/36* (2013.01); *G06Q 20/401* (2013.01); *H04L 9/3213* (2013.01)

(58) Field of Classification Search
CPC ..... H04L 9/3213; G06Q 20/36; G06Q 20/401
See application file for complete search history.

(56) References Cited

U.S. PATENT DOCUMENTS 12,105,789 B2 * 10/2024 Sharma .................... G06F 21/44
2023/0080927 A1 * 3/2023 Padmanabhan ....... G06Q 20/065 705/64
2023/0370272 A1 * 11/2023 Hwang ...................... H04L 9/50
2024/0013198 A1 * 1/2024 Terborg ................ H04L 9/3231
2024/0211947 A1 * 6/2024 Ergen ...................... G06Q 20/36

FOREIGN PATENT DOCUMENTS

CA 3011600 C * 9/2021 ........... G06Q 20/401

OTHER PUBLICATIONS

Gerasimova, Vera; NFT-enriched smart contracts for smart circular economy models; Entrepreneurship and Sustainability Issues, Dec. 2023, vol. 11 (2), p. 93-110.*

* cited by examiner

*Primary Examiner* — Ilse I Immanuel
(74) *Attorney, Agent, or Firm* — Holland & Hart LLP

(57) ABSTRACT

Methods, systems, and devices for data management are described. A self-executing program of a blockchain network (e.g., blockchain distributed data store) may receive, from a client application, a first request to mint an identity attestation token for a user. The first request may include an indication of a wallet address for the user. The self-executing program may generate the identity attestation token that is indicative of first identity information, for the user, that is stored in an off-chain data source and broadcast a message that is configured to transfer the identity attestation token to the wallet address for the user. The self-executing program may receive, from a second application, a request for the first identity information for the user and send, to the second client application after receiving the request, a second message that includes information indicative of the off-chain data source.

17 Claims, 10 Drawing Sheets

IDENTITY ATTESTATION USING A TOKEN

FIELD OF TECHNOLOGY

The present disclosure relates generally to data management, including techniques for identity attestation using a token.

BACKGROUND

Blockchains and related technologies may be employed to support recordation of ownership of digital assets, such as cryptocurrencies, fungible tokens, non-fungible tokens (NFTs), and the like. Generally, peer-to-peer networks support transaction validation and recordation of transfer of such digital assets on blockchains. Various types of consensus mechanisms may be implemented by the peer-to-peer networks to confirm transactions and to add blocks of transactions to the blockchain networks. Example consensus mechanisms include the proof-of-work consensus mechanism implemented by the Bitcoin network and the proof-of-stake mechanism implemented by the Ethereum network. Some nodes of a blockchain network may be associated with a digital asset exchange, which may be accessed by users to trade digital assets or trade a fiat currency for a digital asset.

DETAILED DESCRIPTION

Figure 1:
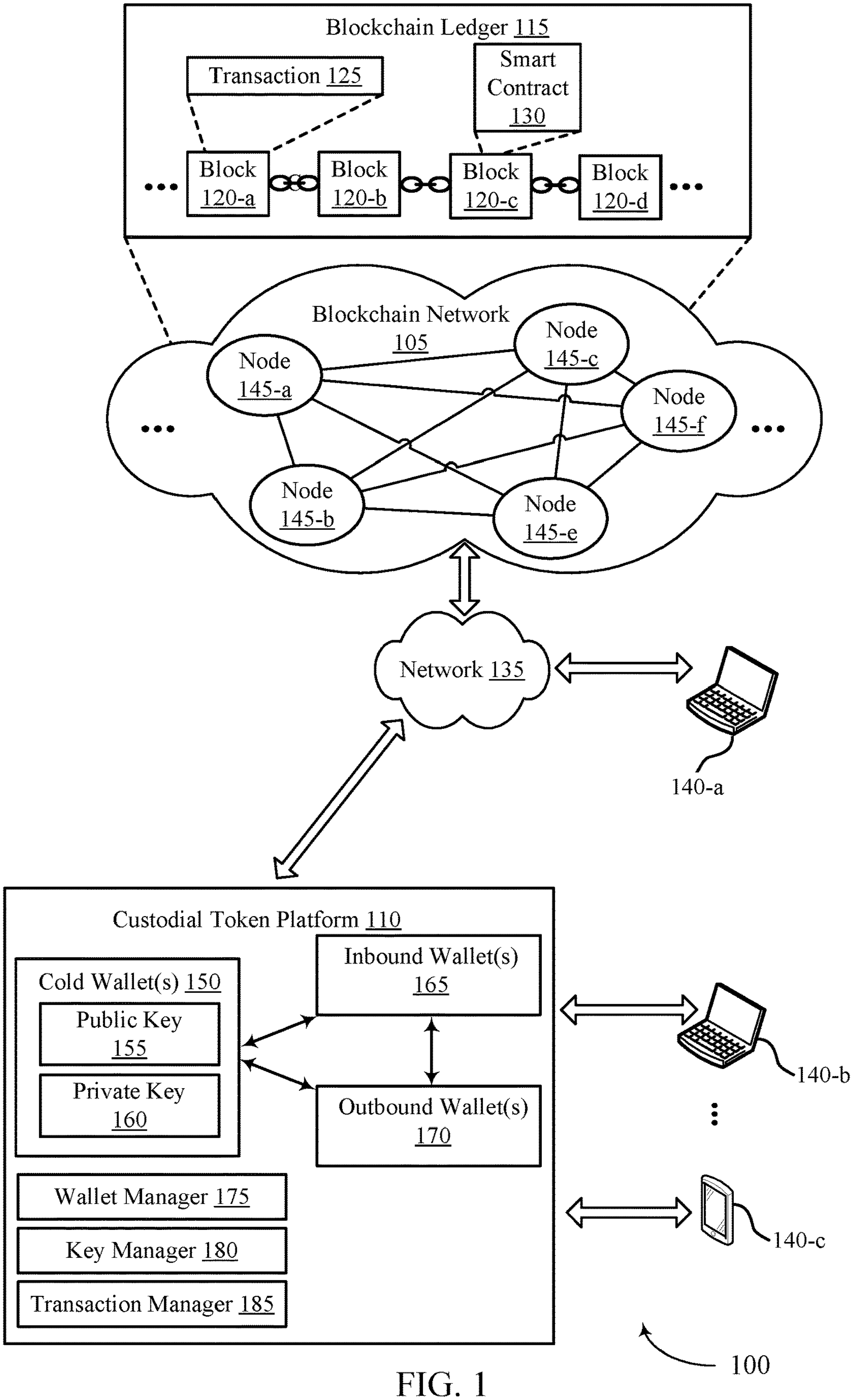
FIG. 1 illustrates an example of a computing environment that supports identity attestation using a token in accordance with aspects of the present disclosure.

Web3 platforms may support various services including decentralized finance ("defi") services, token gated experiences, enhanced loyalty programs, among other services. These platforms may leverage wallet applications on client devices to support access and utilization of such services using blockchain network techniques. For example, a decentralized finance platform may utilize tokens in a user's wallet to support services such as staking, liquidity pools, lending, trading, borrowing, and the like. As another example, one or more services may be accessible using a token that is attributed to a wallet address of a wallet application. In some cases, such services may be conditioned on having or accessing identity information associated with the user accessing such services. However, as blockchain addresses are generally at least pseudo-anonymous (if not fully anonymous), access to and management of identity information for users may be complex and may deter users from leveraging such platforms. Additionally, each platform may have to obtain and securely store such information, which may be resource and computationally inefficient.

Techniques described herein address the forging using a smart contract (e.g., self-executing program) that mints a token (e.g., a non-fungible token (NFT)) for a user in response to a valid request from the user. The token may be indicative of identity information for the user. For example, the token may include metadata that indicates the identity information for the user and/or includes information for retrieving such information from an off-chain location (e.g., an off-chain datastore). For a request to be valid, it may be signed by a platform that has obtained and/or verified such information. For example, a user may be verified on a platform, such as a custodial token platform, and the custodial token platform may sign the token request for the identity attestation token. Verification of a user on the token platform may include verification in accordance with regulations, such as Know Your Customer (KYC) regulations. Thus, the custodial token platform may access a data store with user identity information and may store indications of whether users are verified in accordance with such regulations. Accordingly, the custodial token platform may be a source of truth or trust with regard to user identity information.

The user may access a service of the custodial token platform to request the identity attestation token. The custodial token platform may determine whether the user has information on which the token (or the metadata included in the token) is conditioned, and if so, the custodial token platform may return a data payload to the user's wallet application. The data payload may be signed using a private key of the custodial token platform. The user may then perform one or more actions via the wallet application to cause the request to be transmitted to the smart contract, and the request may include signed data payload. The smart contract may verify the signature, mint the identity attestation token after verification of the signature, and return the identity attestation token to the wallet address.

The user may then access a web3 platform, and access to the web3 platform, or one or more services thereof, may be conditioned on the user's wallet having the identity attestation token (or particular metadata of the identity attestation token). The web3 platform may request access to the user's wallet, identify the token, and then grant or deny access to the services of the web3 platform based on the token. In some cases, the web3 platform may verify the token by communicating with the corresponding smart contract (e.g., the smart contract that mints the token or an associated contract). More particularly, web3 platform (e.g., a client) may call a function of the smart contract, and the function may be configured to provide identity information, verify identity information, or provide an indication of a location for retrieving the identity information. For example, the contract may return a uniform resource locator (URL) for requesting the identity information. The web3 platform may transmit a request to the URL, and receive the identity information as a result. In some examples, the web3 platform executes a callback function that calls the smart contract, which verifies the information and returns a result of the verification to the web3 platform. The wallet application may then be used to access the one or more services of the web3 platform based on the token, the information indicated by the token, or the information retrieved using the token.

FIG. 1 illustrates an example of a computing environment 100 that supports identity attestation using a token in accordance with aspects of the present disclosure. The computing environment 100 may include a blockchain network 105 that supports a blockchain ledger 115, a custodial token platform 110, and one or more computing devices 140, which may be in communication with one another via a network 135.

The network 135 may allow the one or more computing devices 140, one or more nodes 145 of the blockchain network 105, and the custodial token platform 110 to communicate (e.g., exchange information) with one another. The network 135 may include aspects of one or more wired networks (e.g., the Internet), one or more wireless networks (e.g., cellular networks), or any combination thereof. The network 135 may include aspects of one or more public networks or private networks, as well as secured or unsecured networks, or any combination thereof. The network 135 also may include any quantity of communications links and any quantity of hubs, bridges, routers, switches, ports or other physical or logical network components.

Nodes 145 of the blockchain network 105 may generate, store, process, verify, or otherwise use data of the blockchain ledger 115. The nodes 145 of the blockchain network 105 may represent or be examples of computing systems or devices that implement or execute a blockchain application or program for peer-to-peer transaction and program execution. For example, the nodes 145 of the blockchain network 105 support recording of ownership of digital assets, such as cryptocurrencies, fungible tokens, non-fungible tokens (NFTs), and the like, and changes in ownership of the digital assets. The digital assets may be referred to as tokens, coins, crypto tokens, or the like. The nodes 145 may implement one or more types of consensus mechanisms to confirm transactions and to add blocks (e.g., blocks 120-*a*, 120-*b*, 120-*c*, and so forth) of transactions (or other data) to the blockchain ledger 115. Example consensus mechanisms include a proof-of-work consensus mechanism implemented by the Bitcoin network and a proof-of-stake consensus mechanism implemented by the Ethereum network.

When a device (e.g., the computing device 140-*a*, 140-*b*, or 140-*c*) associated with the blockchain network 105 executes or completes a transaction associated with a token supported by the blockchain ledger, the nodes 145 of the blockchain network 105 may execute a transfer instruction that broadcasts the transaction (e.g., data associated with the transaction) to the other nodes 145 of the blockchain network 105, which may execute the blockchain application to verify the transaction and add the transaction to a new block (e.g., the block 120-*d*) of a blockchain ledger (e.g., the blockchain ledger 115) of transactions after verification of the transaction. Using the implemented consensus mechanism, each node 145 may function to support maintaining an accurate blockchain ledger 115 and prevent fraudulent transactions.

The blockchain ledger 115 may include a record of each transaction (e.g., a transaction 125) between wallets (e.g., wallet addresses) associated with the blockchain network 105. Some blockchains may support smart contracts, such as smart contract 130, which may be an example of a sub-program that may be deployed to the blockchain and executed when one or more conditions defined in the smart contract 130 are satisfied. For example, the nodes 145 of the blockchain network 105 may execute one or more instructions of the smart contract 130 after a method or instruction defined in the smart contract 130 is called by another device. In some examples, the blockchain ledger 115 is referred to as a blockchain distributed data store.

A computing device 140 may be used to input information to or receive information from the computing system custodial token platform 110, the blockchain network 105, or both. For example, a user of the computing device 140-*a* may provide user inputs via the computing device 140-*a*, which may result in commands, data, or any combination thereof being communicated via the network 135 to the computing system custodial token platform 110, the blockchain network 105, or both. Additionally, or alternatively, a computing device 140-*a* may output (e.g., display) data or other information received from the custodial token platform 110, the blockchain network 105, or both. A user of a computing device 140-*a* may, for example, use the computing device 140-*a* to interact with one or more user interfaces (e.g., graphical user interfaces (GUIs)) to operate or otherwise interact with the custodial token platform 110, the blockchain network 105, or both.

A computing device 140 and/or a node 145 may be a stationary device (e.g., a desktop computer or access point) or a mobile device (e.g., a laptop computer, tablet computer, or cellular phone). In some examples, a computing device 140 and/or a node 145 may be a commercial computing device, such as a server or collection of servers. And in some examples, a computing device 140 and/or a node 145 may be a virtual device (e.g., a virtual machine).

Some blockchain protocols support layer one and layer two crypto tokens. A layer one token is a token that is supported by its own blockchain protocol, meaning that the layer one token (or a derivative thereof), may be used to pay transaction fees for transacting using the blockchain protocol. A layer two token is a token that is built on top of layer one, for example, using a smart contract 130 or a decentralized application ("DApp"). The smart contract 130 or decentralized application may issue layer two tokens to various users based on various conditions, and the users may transact using the layer two tokens, but transaction fees may be based on the layer one token (or a derivative thereof).

The custodial token platform 110 may support exchange or trading of digital assets, fiat currencies, or both by users of the custodial token platform 110. The custodial token platform 110 may be accessed via website, web application, or applications that are installed on the one or more computing devices 140. The custodial token platform 110 may be configured to interact with one or more types of blockchain networks, such as the blockchain network 105, to support digital asset purchase, exchange, deposit, and withdrawal.

For example, users may create accounts associated with the custodial token platform 110 such as to support purchasing of a digital asset via a fiat currency, selling of a digital asset via fiat currency, or exchanging or trading of digital assets. A key management service (e.g., a key manager) of the custodial token platform 110 may create, manage, or otherwise use private keys that are associated with user wallets and internal wallets. For example, if a user wishes to withdraw a token associated with the user account to an external wallet address, key manager 180 may sign a transaction associated with a wallet of the user, and broadcast the signed transaction to nodes 145 of the blockchain network 105, as described herein. In some examples, a user does not have direct access to a private key associated with a wallet or account supported or managed by the custodial token platform 110. As such, user wallets of the custodial token platform 110 may be referred to non-custodial wallets or non-custodial addresses.

The custodial token platform 110 may create, manage, delete, or otherwise use various types of wallets to support digital asset exchange. For example, the custodial token platform 110 may maintain one or more internal cold wallets 150. The internal cold wallets 150 may be an example of an offline wallet, meaning that the cold wallet 150 is not directly coupled with other computing systems or the network 135 (e.g., at all times). The cold wallet 150 may be used by the custodial token platform 110 to ensure that the custodial token platform 110 is secure from losing assets via hacks or other types of unauthorized access and to ensure that the custodial token platform 110 has enough assets to cover any potential liabilities. The one or more cold wallets 150, as well as other wallets of the blockchain network 105 may be implemented using public key cryptography, such that the cold wallet 150 is associated with a public key 155 and a private key 160. The public key 155 may be used to publicly transact via the cold wallet 150, meaning that another wallet may enter the public key 155 into a transaction such as to move assets from the wallet to the cold wallet 150. The private key 160 may be used to verify (e.g., digitally sign) transactions that are transmitted from the cold wallet 150, and the digital signature may be used by nodes 145 to verify or authenticate the transaction. Other wallets of the custodial token platform 110 and/or the blockchain network 105 may similarly use aspects of public key cryptography.

The custodial token platform 110 may also create, manage, delete, or otherwise use inbound wallets 165 and outbound wallets 170. For example, a wallet manager 175 of the custodial token platform 110 may create a new inbound wallet 165 for each user or account of the custodial token platform 110 or for each inbound transaction (e.g., deposit transaction) for the custodial token platform 110. In some examples, the custodial token platform 110 may implement techniques to move digital asset between wallets of the digital asset exchange platform. Assets may be moved based on a schedule, based on asset thresholds, liquidity requirements, or a combination thereof. In some examples, movements or exchanges of assets internally to the custodial token platform 110 may be "off-chain" meaning that the transactions associated with the movement of the digital asset are not broadcast via the corresponding blockchain network (e.g., blockchain network 105). In such cases, the custodial token platform 110 may maintain an internal accounting (e.g., ledger) of assets that are associated with the various wallets and/or user accounts.

As used herein, a wallet, such as inbound wallets 165 and outbound wallets 170 may be associated with a wallet address, which may be an example of a public key, as described herein. The wallets may be associated with a private key that is used to sign transactions and messages associated with the wallet. A wallet may also be associated with various user interface components and functionality. For example, some wallets may be associated with or leverage functionality for transmitting crypto tokens by allowing a user to enter a transaction amount, a receiver address, etc. into a user interface and clicking or activating a UI component such that the transaction is broadcast via the corresponding blockchain network via a node (e.g., a node 145) associated with the wallet. As used herein, "wallet" and "address" may be used interchangeably.

In some cases, the custodial token platform 110 may implement a transaction manager 185 that supports monitoring of one or more blockchains, such as the blockchain ledger 115, for incoming transactions associated with addresses managed by the custodial token platform 110 and creating and broadcasting on-blockchain transactions when a user or customer sends a digital asset (e.g., a withdrawal). For example, the transaction manager 185 may monitor the addressees of the customers for transfer of layer one or layer two tokens supported by the blockchain ledger 115 to the addresses managed by the custodial token platform 110. As another example, when a user is withdrawing a digital asset, such as a layer one or layer two token, to an external wallet (e.g., an address that is not managed by the custodial token platform 110 or an address for which the custodial token platform 110 does not have access to the associated private key), the transaction manager 185 may create and broadcast the transaction to one or more other nodes 145 of the blockchain network 105 in accordance with the blockchain application associated with the blockchain network 105. As such, the transaction manager 185, or an associated component of the custodial token platform 110 may function as a node 145 of the blockchain network 105.

As described herein, the custodial token platform may implement and support various wallets including the inbound wallets 165, the outbound wallets 170, and the cold wallets 150. Further, the custodial token platform 110 may implement techniques to maintain and manage balances of the various wallets. In some examples, the balances of the various wallets are configured to support security and liquidity. For example, the custodial token platform 110 may implement transactions that move crypto tokens between the inbound wallets 165 and the outbound wallets 170. These transactions may be referred to as "flush" transactions and may occur on a periodic or scheduled basis.

As described herein, various transactions may be broadcast to the blockchain ledger 115 to cause transfer of crypto tokens, to call smart contracts, to deploy smart contracts etc. In some examples, these transactions may also be referred to as messages. That is, the custodial token platform 110 may broadcast a message to the blockchain network 105 to cause transfer of tokens between wallets managed by the custodial token platform 110 to cause transfer of tokens from a wallet managed by the custodial token platform 110 to an external wallet, to deploy a smart contract (e.g., a self-executing program), or to call a smart contract. Multiple different examples of the custodial token platform 110 may interact with the blockchain network 105 and may have similar infrastructure as the custodial token platform 110 of FIG. 1. Each of the different custodial token platforms may be configured to use tokens issued by other custodial token platforms interacting with the blockchain network 105.

The custodial token platform 110 may perform various techniques for verification of user information to allow the user access to services supported by the custodial token platform. In some cases, access to the custodial token platform 110 may be conditioned on the user providing a set of identity information, and the custodial token platform 110 may verify such information before allowing the user to access the services. For example, the custodial token platform 110 may perform procedures, such as a KYC check, to obtain and verify user information. After verification, the custodial token platform 110 may store such information and/or an indication of verification in a data store.

Users may access web3 platforms, such as web3 platforms supported by one or more smart contracts (e.g., smart contract 130) using a wallet application on a user device 140. In some cases, access to such platforms may be conditioned on identity information for users, but such information my not typically be available using the wallet application and/or blockchain techniques. That is, the transactions and communications via the blockchain network 105 may be conditioned on utilization of the wallet application and/or a public/private key pair, but these communications may not use or have access to information (e.g., personal identifying information (PII)) for the user. Thus, for a user to access services that may be conditioned on such information, the user may be required to provide information to the web3 platform, and the web3 platform may need to perform verification (e.g., KYC checks). However, different systems and techniques may be needed to support these verification procedures, and these systems may be complex, computationally inefficient, and redundant.

Techniques described herein support access to web3 platforms based on identity information for the user, where such information is provided using an identity attestation token and an off-chain data source. For example, the user may have an account with the custodial token platform 110, and the custodial token platform 110 may obtain, verify, and/or store identity information for the user. In some cases, the custodial token platform 110 may perform KYC checks for the user and may store an indication that the user has passed the KYC checks. Rather than have other platforms perform similar information obtainment, verification, and storage, techniques allow these other platforms, such as a web3 platforms, to utilize the procedures performed and the information obtained by the custodial token platform 110. More particularly, the custodial token platform 110 may deploy a smart contract (e.g., smart contract 130) that is configured to mint identity attestation tokens for users and provide such information to user wallets. When the user tries to access another platform, such as a DApp, using the user wallet, the DApp may identify that the user has the identity attestation token in the user wallet. In some cases, the DApp may communicate with the smart contract that mints the token to retrieve identity information and/or verify the token or user identity information. In some examples, the DApp may receive, from the smart contract, information that is indicative of an off-chain data source that stores the user identity information. For example, the DApp may obtain a URL that is used to request the identity information, such as a URL associated with a data store maintained by the custodial token platform 110. As such, the DApp is able to verify the user information (e.g., verify that the user is verified through a KYC check) by leveraging an identity attestation token and associated smart contract. As such, the custodial token platform 110 (or a similar entity) may perform procedures to obtain, verify, and store identity information and other platform or systems may leverage these services provided by the custodial token platform 110 to provide other services to users.

Figure 2:
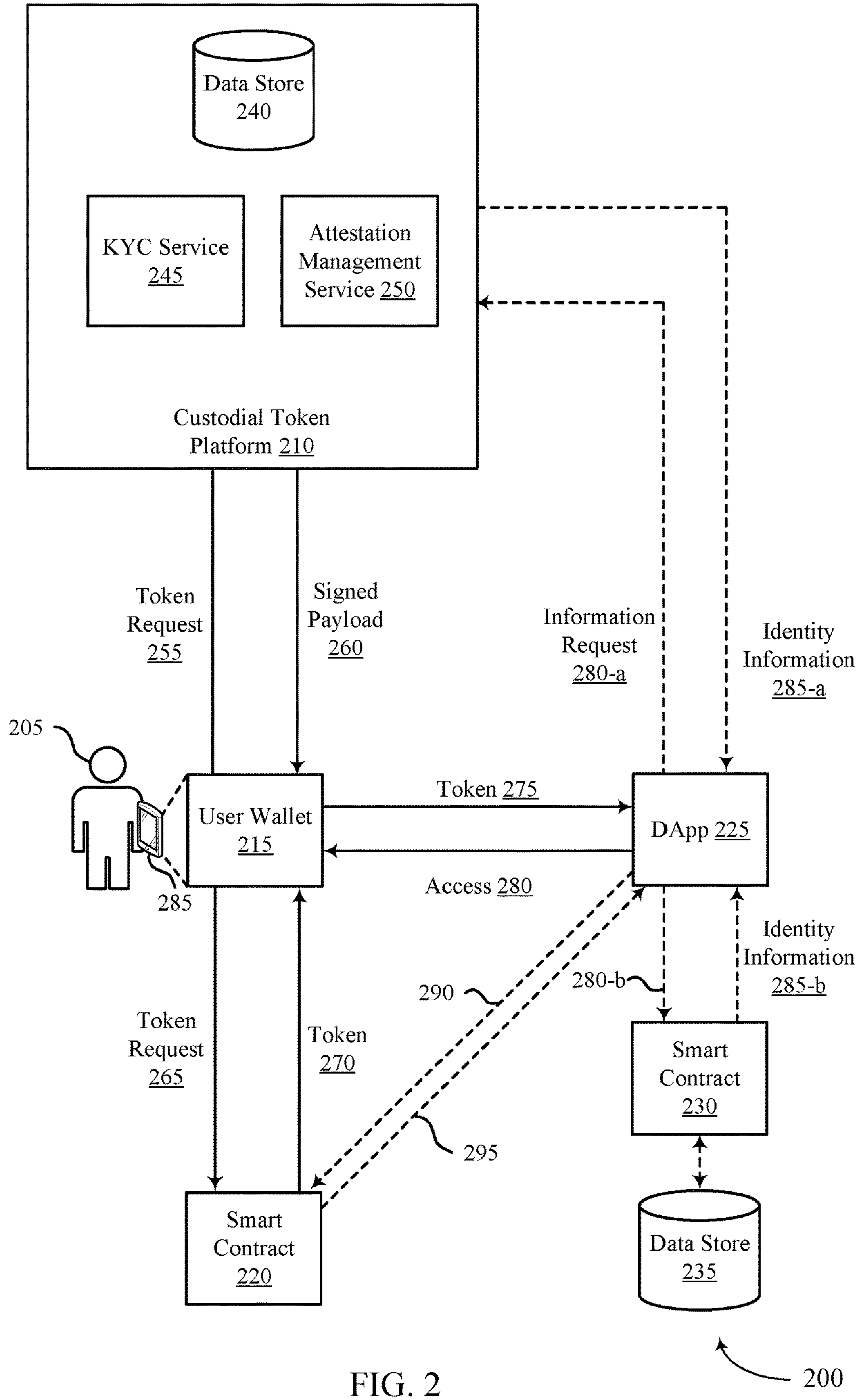
FIG. 2 shows an example of a computing environment that supports identity attestation using a token in accordance with aspects of the present disclosure.

FIG. 2 shows an example of a computing environment 200 that supports identity attestation using a token in accordance with aspects of the present disclosure. The computing environment 200 includes a custodial token platform 210, a user 205 with a user device 285, and various aspects of a blockchain network. The custodial token platform 210 may be an example of the custodial token platform 110 as described with respect to FIG. 1. The user device 285 may be an example of a computing device 140 of FIG. 1 and may execute a wallet application (e.g., client application) that includes a user wallet 215.

The user 205 may have an account with the custodial token platform 210, and as such, may provide various user identity information for the user 205. The custodial token platform 210 may include various services, such as KYC service 245, that obtains the user information and verifies such information. That is, the KYC service 245 may perform KYC checks on the user information to verify the user information. This KYC check may be performed to allow the user to access services provided by the custodial token platform, such as trading services, staking services, etc. The custodial token platform 210 may store user identity information and or indications of verification (e.g., KYC verification) in a data store 240, which may be an example of an off-chain data source, as described herein.

The user 205 has access to the user wallet 215, which may be an example of a wallet allocation that may be a self-custody wallet, a multi-party computation (MPC) wallet, a hardware wallet, software wallet, or a combination thereof. In some examples, the user wallet 215 may be linked to the user account at the custodial token platform 210. The user may access other blockchain services using the user wallet 215, and the other blockchain services may include token-gated experiences, defi platforms, NFT platforms, or the like. That is, access to such services may be based on the user wallet 215 and information associated with the user wallet 215 via the blockchain (e.g., the blockchain ledger 115). In some examples, these blockchain platforms may want to provide services that are contingent on specific identity information for the user. However, as the user wallet is generally at least pseudo-anonymous, such information may not be readily available for these platforms. These platforms may implement their own user identity information retrieval, verification, and storage services, but such services may be expensive in terms of computation and memory, and may come with significant additional user and resource overhead.

Techniques described herein support access to services provided by web3 platforms based on user identity information and an identity attestation token. Using the techniques described herein, the web3 platform leverages the services provided by the custodial token platform 210 to provide additional services based on the identity information of the user obtained and verified by the custodial token platform 210. These techniques may reduce processor and memory overhead and reduce redundancies, while providing an enhanced user experience in navigating web3 platforms.

For example, the user 205 may access the custodial token platform 210 to request an identity attestation token that is used to provide identity information to other platforms, such as a DApp 225. More particularly, the custodial token platform 210 may provide a service (e.g., an attestation management service 250) through which the user 205 may request the identity attestation token via token request 255. After receiving the token request 255, the custodial token platform 210 may provide a signed payload 260 to the user 205. The signed payload 260 may be signed by a public key of an operator or another entity associated with or configured at a smart contract 220. The smart contract 220 may be an example of the smart contract 130 of FIG. 1. In some cases, the smart contract 220 is deployed by the custodial token platform 210 or another entity that obtains and verifies user identity information.

After receiving the signed payload 260, the user wallet 215 may prompt the user to request the identity attestation token from the smart contract 220. For example, the wallet application may prompt the user to sign the payload using the user wallet 215, and the payload may be broadcast via the blockchain network such that the smart contract 220 receives the signed payload as token request 265. The smart contract 220 may be configured to identify that the payload is signed by an operator of the smart contract. For example, the smart contract 220 may execute a set of instructions to identify the payload signatures (e.g., the signature of the user wallet 215 and of the custodial token platform 210) and verify the signatures. Verification of the signatures may include determining that the payload is signed by an operator of the smart contract 220, such as the private key of the custodial token platform 210 (e.g., based on the public key of the custodial token platform 210). Verification of the signature may also include verifying that the payload is signed by the private key associated with the user wallet 215 (e.g., using the public key of the user wallet 215).

After or in response to verification of the signatures of the token request 265, the smart contract 220 may execute a set of instructions to generate an identity attestation token that includes an indication of the identity information for the user. The indication of the identity information may correspond to identity information that is stored in an off-chain data source, such as the data store 240 of the custodial token platform 210. The indication of the identity information may be encoded or included in metadata of the identity attestation token. In some examples, the indication of the identity information may correspond to or be an address of the smart contract 220 that generates the identity attestation token. Additionally, or alternatively, the indication of the identity information may be a URL where the identity information may be requested via the off-chain data source. Additionally, or alternatively, the identity information included in the identity attestation token may include on-chain information, such as an indication that the user 205 has passed a KYC check (e.g., the token includes metadata that indicates that the user has passed a KYC checked). In some examples, the token is generated based on the information that is included in the token request 265. For example, the signed payload 260 may include a flag or indication that the user 205 has passed the KYC check, and the token is generated by the smart contract 220 based on this information being included in the token request 265. Additionally, or alternatively, the request/payload may include an identifier for the user (e.g., a user identifier maintained by the custodial token platform 210), and the generated token may include this identifier as metadata.

The token may also include information or parameters that effectively restricts transfer of the token to another wallet address or renders a token invalid (e.g., it may not be used by platforms to verify a user's identity). For example, the token may be an example of a "soul-bound" token that is bound to the user wallet 215 (e.g., the user wallet address). A soul-bound token may be generated in accordance with a standard that restricts transfer of the token via the blockchain network. Additionally, or alternatively, the wallet address may be encoded as metadata of the token. If the user transfers the token, then the address of the metadata and the address of the wallet holding the token may be different, and as such, a platform may not honor the token.

After generating the token, the smart contract 220 may execute instructions (e.g., nodes of the blockchain execute instructions) that cause a message to be broadcast via the blockchain network, and the message may cause transfer of the token to the user wallet 215. As such, the user wallet 215 is provided the identity attestation token that may be used to access various web3 platforms and services. For example, the user 205 may access the DApp 225, which may represent a defi service, a token gated community or experience, or the like. The DApp 225 may offer a service that is contingent on access to user identity information, such as an indication of whether the user is has passed KYC checks. In some examples, the service is a staking service that offers higher rewards to users that have passed KYC checks. After accessing the DApp 225 or service, the DApp 225 may request that the user connect the user wallet 215. The user 205 may enter credentials, and the DApp 225 may connect to the wallet. In some cases, the user wallet 215 is already connected to the DApp 225.

After connecting the user wallet 215, the DApp 225 may identify the token 275 (e.g., the identity attestation token) that is attributed to the user wallet 215. The DApp 225 may identity that the token 275 is the identity attestation token and unlock the service. Additionally, or alternatively, the DApp 225 may identify the metadata associated with the token 275 and unlock the service based on the metadata including an indication (e.g., a KYC indication). Additionally, or alternatively, the DApp 225 may be configured to retrieve and verify user identity information before unlocking the service. In such cases, the DApp 225 may identify the information, included in the token 275, that is indicative of the identity information that is stored in the off-chain data source. In some cases, the DApp 225 may retrieve the smart contract address for the smart contract 220 that generated the token and initiate communications with the smart contract 220 to retrieve the user identity information. For example, the DApp 225 may call a function of the smart contract 220 by broadcasting a message via the blockchain network. The function call (e.g., function call 290) may include an indication of the token (e.g., a token identifier), a wallet address of the user wallet 215, a user identifier (e.g., as retrieved from the token), or a combination thereof. In response to receiving the function call 290, the smart contract 220 may return location information for the user identity information stored in the off-chain data source. For example, the smart contract 220 may return a URL for the requesting the data from the off-chain data source as a response 295 or a smart contract address for a smart contact that is able to retrieve the identity information from an off-chain data source. In some cases, the response 295 includes a callback function and/or other parameters.

In response to retrieving the information indicative of the off-chain data source (e.g., from the token 275, the smart contract 220, or both), the DApp 225 may perform communications to retrieve and/or verify the user identity information. For example, in case the DApp 225 retrieves a URL as the information that is indicative of the off-chain data source, the DApp 225 may transmit a Hypertext Transfer Protocol (HTTP) request using the retrieved URL as an information request 280-*a*. The URL may correspond to an address of the attestation management service 250 of the custodial token platform 210, and the attestation management service 250 may have access to the data store 240. In response to the HTTP request, the attestation management service 250 may return a response that includes identity information 285-*a*. The identity information may include information associated with the user 205, such as PII, or may include an indication that the user has passed KYC checks or other identity verification procedures. After or in response to receiving the identity information 285-*a*, the DApp 225 may unlock the service and allow the user 205 to access the service using the user wallet 215. Additionally, or alternatively, before allowing access to the service, the DApp 225 may verify the received identity information 285-*a*. For example, as noted above, the response 295 from the smart contract 220 may include a callback function. Thus, the DApp 225 may call the callback function of the smart contract 220 and the call may include the received identity information. The smart contract 220 may execute instructions to verify the identity information 285-*a* and return a result of the verification to the DApp 225. If the information is verified, the DApp 225 may unlock the service for the user 205 and the user wallet 215. That is, the DApp 225 allows access 280 to the service based on the identity information 285-*a*.

In the example of the smart contract 220 returning an address of another smart contract (e.g., smart contract 230), the DApp 225 may call a function of the smart contract to retrieve the identity information. For example, the DApp 225 transmits an information request 280-*b* to the smart contract 230. More particularly, the DApp 225 may broadcast a message that is figured to call a function of the smart contract 230. The smart contract 230 may execute instructions to retrieve the identity information from the off-chain data source, such as data store 235. The smart contract 230 may return the identity information 285-*b* to the DApp 225. The DApp 225 may then unlock the service for the user 205 and the user wallet 215. That is, the DApp 225 allows access 280 to the service based on the identity information 285-*b*.

The various services provided by the DApp 225 may include lending services (e.g., based on a credit score stored in an off-chain data source), enhanced on-chain earning experiences, access to liquid pool for staking through KYC attestation, gaming campaign offerings (e.g., based on proving uniqueness/skills of a player). Further, the techniques described herein may support proof of skills and improved airdrop experiences that limit duplicative claims by one user. The identity information may also include graduation proof (e.g., by universities), marriage certificates (e.g., by governments), and the like. As such, the user identity information described herein may include many different types of information (e.g., credit score, identity, asset holding, citizenship, marriage, skills, completed tasks). For example, the token may indicate that the user is married and that the user has passed a KYC check and additional information may be retrieved from an off-chain data source.

Further, the custodial token platform 210, the self-executing program 220, or both, may provide techniques for the user to revoke the token and or to renew the token. For example, if the user loses access to the user wallet 215, then the user may access the custodial token platform 210 to revoke the token and/or request a new one. In such cases, the custodial token platform 210 may perform additional verification of the user via credentials and information and the user may be allowed to generate a new token and access/use the token via a new wallet address.

As described herein, the token may include metadata that is on-chain and data that is off-chain. Configuration of such information may be based on the cost and needs. However, there may be relationship between on-chain and off-chain data. For example, the token may indicate that the user is verified (e.g., based on flag in the metadata), but additional information may be retrieved from an off-chain data source, as described herein. Thus, the user's KYC status may be an "attribute" of the token, but additional information is retrievable off-chain. Thus, an off-chain dataset is a superset of the on-chain dataset. The KYC status (or similar identity information) may also be maintained by the smart contract 220. For example, the smart contract 220 may maintain a KYC status for each token identifier. As such, the smart contract 220 may include a function that updates a KYC status for a user or token identifier.

As some user identity information may be maintained on-chain, the custodial token platform 210 (e.g., the attestation management service 250) may manage user metadata, categorize information (e.g., on-chain or off-chain), and manage the on-chain data. For example, the on-chain data may be tracked and be periodically updated. As such, the attestation management service 250 may bridge the gap between the off-chain dataset and the on-chain dataset. Additionally, in some examples, on-chain data may be encrypted such that it is not public to entities accessing the chain.

Figure 3:
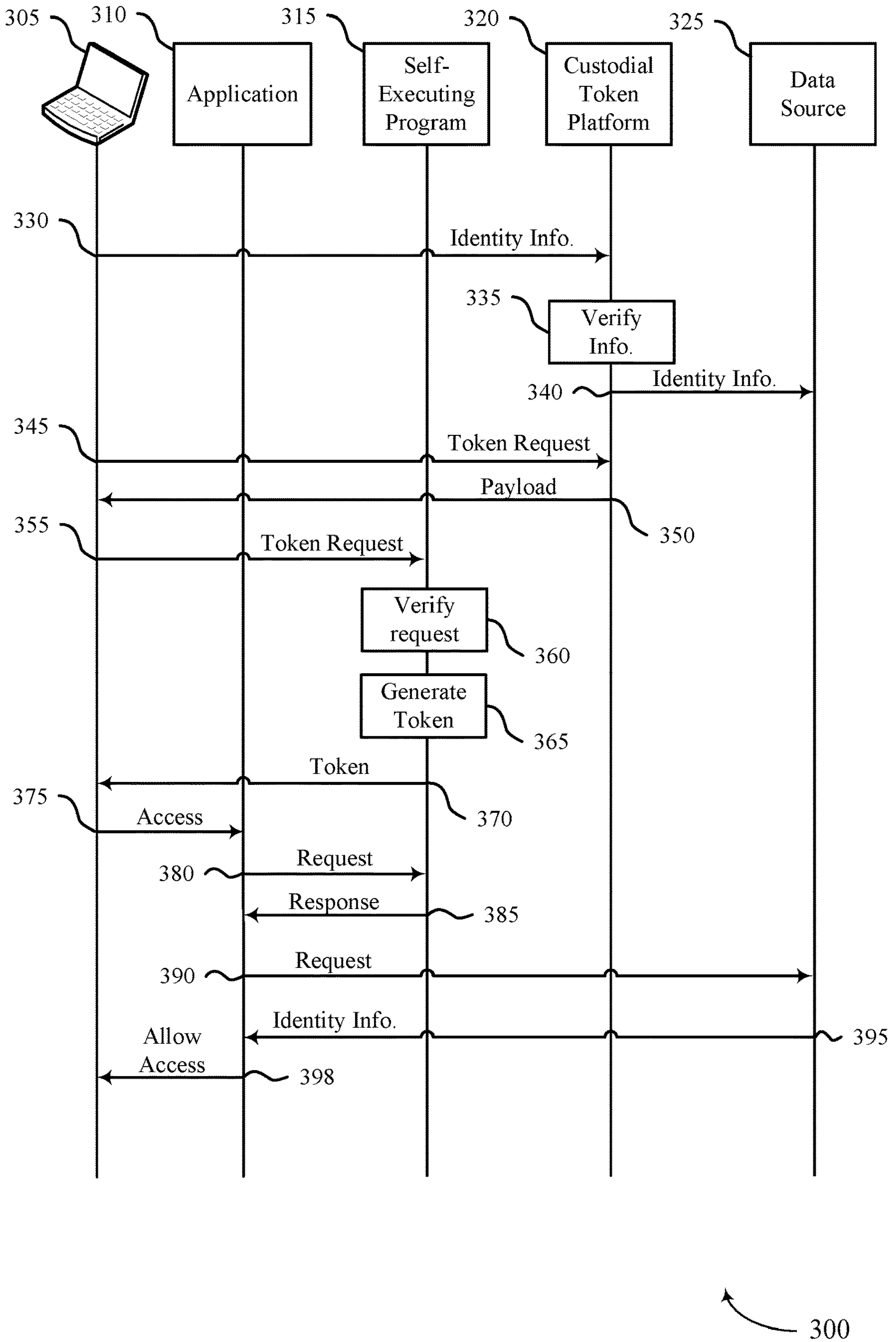
FIG. 3 shows an example of a process flow that supports identity attestation using a token in accordance with aspects of the present disclosure.

FIG. 3 shows an example of a process flow 300 that supports identity attestation using a token in accordance with aspects of the present disclosure. The process flow 300 includes a user device 305, an application 310, a self-executing program 315, a custodial token platform 320, and a data source 325. The user device 305 may be an example of the computing devices 140 as described with respect to FIG. 1. The custodial token platform 320 may be an example of the custodial token platform 110 of FIG. 1. or the custodial token platform 210 of FIG. 2. The self-executing program 315 may be an example of the smart contract 220 of FIG. 2 or the smart contract 130 of FIG. 1. The application 310 may be an example of a client application or a DApp 225 as described with respect to FIG. 2. The data source 325 may be an example of an off-chain data source, as described herein. In some examples, the data source 325 is maintained by or associated with the custodial token platform 320. In other cases, the data source 325 is associated with another entity such as another web3 platform (e.g., another self-executing program).

At 330, a user, via the user device 305 provides, and the custodial token platform 330 obtains, identity information for the user. At 335, the custodial token platform 320 verifies the identity information. For example, the custodial token platform 320 may perform a KYC check using the identity information. Other forms of identity information are contemplated within the scope of the present disclosure. In some examples, another entity, such as a KYC service or identity verification service obtains and verifies the identity information. That is, another service working in conjunction with or not associated with the custodial token platform 320 may obtain and verify the identity information. At 340, the identity information and/or an indication of verification of the identity information is stored at the data source 325.

At 345, the user device 305 transmits, and the custodial token platform receives, a request for an identity attestation token. In some examples, the user device 305 is redirected to the attestation token service of the custodial token platform from the application 310. For example, the user may access the application 310 via the user device 305, and the application may offer a service based on the user having the identity attestation token. The application 310 may provide a user interface (UI) component whereby the user may request the identity attestation token and activation of the UI component may redirect the user device 305 to the custodial token platform 320 (or a service that supports an identity attestation token). At the custodial token platform 320, the user may enter credentials, provide additional identity information, etc. The custodial token platform 320 may verify user credentials and generate a payload for use in generation of the identity attestation token. For example, the payload may include information associated with the user (e.g., the user wallet address, user identifier, an indication of information verification, an indication of a location of the off-chain data store), and the payload may be signed by or include a signature of the custodial token platform 320 (or the token service). At 360, the custodial token platform 320 may return the payload to the user device 305 (e.g., the wallet application of the user device).

After receiving the payload, the wallet application (e.g., client application) of the user device 305 may generate a message that includes the payload received from the custodial token platform 320. The wallet application may display the transaction such that the user may verify and cause the message to be transmitted. The message may be broadcast via the blockchain network at 355 as token request. Thus, at 355, the self-executing program 315 (e.g., stored on a blockchain distributed data store or blockchain ledger) receives the request to mint an identity attestation token for the user. The request may include a wallet address of the user and may include the payload signed by the custodial token platform. At 360, the self-executing program may execute a set of instructions to verify that the request includes a signature associated with an operator associated with the self-executing program. In the example of FIG. 3, the operator is the custodial token platform 320, but as described herein, the operator may be another service or platform, such as a service configured to obtain and verify user identity information. The operator may be the entity that deploys and/or manages the self-executing program 315. Verification of the request may include matching a signature of the request to the public key associated with the operator.

At 365, the self-executing program 315 may generate (e.g., mint) the identity attestation token that is indicative of first identity information, for the user, that is stored in an off-chain data source (e.g., the data source 325). The identity attestation token may include information associated with the user, such as a user identifier, an indication that the user is verified (e.g., has passed KYC checks), the wallet address of the user, a location of the off-chain data source, or other information. This information may be included as metadata in the token. In some examples, the token may include, encode, or link to, a visualization of the identity attestation. The token may also include one or more parameters that restrict transfer of the identity attestation token to another wallet address.

At 370, the self-executing program 315 may broadcast a message that is configured to transfer the identity attestation token to the wallet address for the user. More particularly, the self-executing program 315 may broadcast the message via the blockchain network.

At 375, user may access the application 310 via the user device 305. More particularly, the user may access the service that is contingent on the user having the identity attestation token in the wallet application. The application 310 may be configured to validate that the user's wallet has the identity attestation token and provide access to the service based on validation of the token. As illustrated in FIG. 3, the application 310 may also be configured to obtain the identity information for the user. As such, at 380, the application 310 may transmit, and the self-executing program 315 may receive, a request for the identity information for the user, and the request may include an identifier for the identity attestation token. The application 310 may identify the address of the self-executing program 315 based on information included in the token.

At 385, the self-executing program may send, to the application 310 after receiving the request, a second message that includes information indicative of the off-chain data source. The information indicative of the off-chain data store may include an address for a second self-executing program used to request the identity information. Additionally, or alternatively, the information indicative of the off-chain data source may include a URL used to request the identity information for the user.

At 390, the application 310 may transmit, to the off-chain data source or to an associated entity, a request for the identity information. The request may include information associated with the user, an identifier for the user, an identifier for the identity attestation token, or a combination thereof. In some cases, the request is an HTTP request based on receiving the URL. In other cases, the request is a message that is configured to call a function of another self-executing program associated with the off-chain data source 325. At 395, the off-chain data source 325 may provide a response that includes the identity information for the user. The identity information may include PII data, indications of verification of the identity information, or a combination thereof.

At 398, the application 310 may allow access to the service that is contingent on the identity information for the user. In some examples, before providing access, the application 310 may communicate with the self-executing program 315 to verify the identity information.

Figure 4:
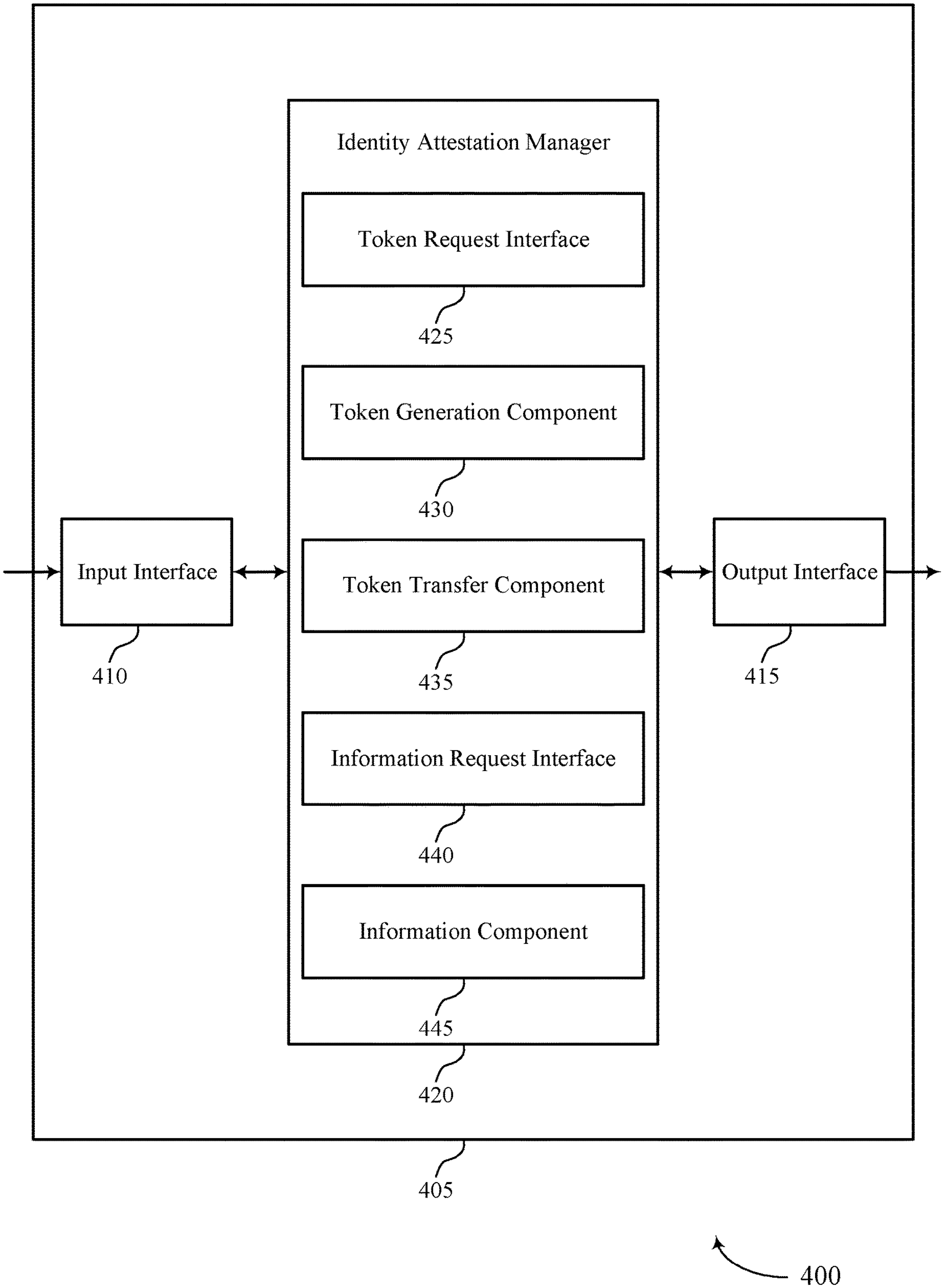
FIG. 4 shows a block diagram of an apparatus that supports identity attestation using a token in accordance with aspects of the present disclosure.

FIG. 4 shows a block diagram 400 of a system 405 that supports identity attestation using a token in accordance with aspects of the present disclosure. The system 405 may include an input interface 410, an output interface 415, and an identity attestation manager 420. The system 405 may also include a processor. Each of these components may be in communication with one another (e.g., via one or more buses, communications links, communications interfaces, or any combination thereof).

The input interface 410 may manage input signaling for the system 405. For example, the input interface 410 may receive input signaling (e.g., messages, packets, data, instructions, commands, transactions, or any other form of encoded information) from other systems or devices. The input interface 410 may send signaling corresponding to (e.g., representative of or otherwise based on) such input signaling to other components of the system 405 for processing. For example, the input interface 410 may transmit such corresponding signaling to the identity attestation manager 420 to support identity attestation using a token. In some cases, the input interface 410 may be a component of a network interface 625 as described with reference to FIG. 6.

The output interface 415 may manage output signaling for the system 405. For example, the output interface 415 may receive signaling from other components of the system 405, such as the identity attestation manager 420, and may transmit such output signaling corresponding to (e.g., representative of or otherwise based on) such signaling to other systems or devices. In some cases, the output interface 415 may be a component of a network interface 625 as described with reference to FIG. 6.

For example, the identity attestation manager 420 may include a token request interface 425, a token generation component 430, a token transfer component 435, an information request interface 440, an information component 445, or any combination thereof. In some examples, the identity attestation manager 420, or various components thereof, may be configured to perform various operations (e.g., receiving, monitoring, transmitting) using or otherwise in cooperation with the input interface 410, the output interface 415, or both. For example, the identity attestation manager 420 may receive information from the input interface 410, send information to the output interface 415, or be integrated in combination with the input interface 410, the output interface 415, or both to receive information, transmit information, or perform various other operations as described herein.

The token request interface 425 may be configured as or otherwise support a means for receiving, at a self-executing program stored on a blockchain distributed data store and from a first client application associated with the self-executing program, a first request to mint an identity attestation token for a user, wherein the first request includes an indication of a wallet address for the user. The token generation component 430 may be configured as or otherwise support a means for generating the identity attestation token that is indicative of first identity information, for the user, that is stored in an off-chain data source. The token transfer component 435 may be configured as or otherwise support a means for broadcasting a message that is configured to transfer the identity attestation token to the wallet address for the user. The information request interface 440 may be configured as or otherwise support a means for receiving, at the self-executing program and from a second application, a request for the first identity information for the user, the request including an identifier for the identity attestation token. The information component 445 may be configured as or otherwise support a means for sending, to the second application after receiving the request, a second message that includes information indicative of the off-chain data source.

Figure 5:
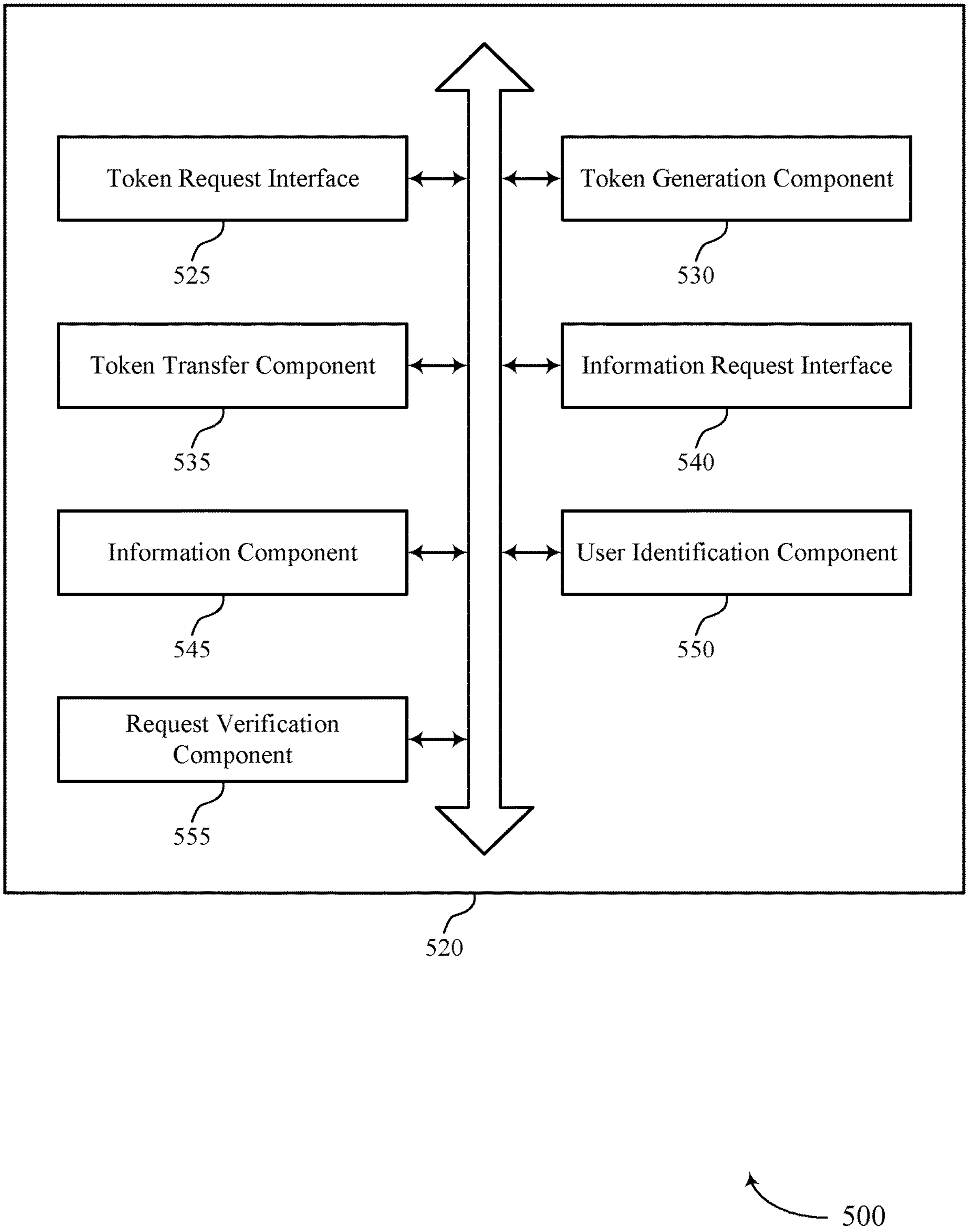
FIG. 5 shows a block diagram of an identity attestation manager that supports identity attestation using a token in accordance with aspects of the present disclosure.

FIG. 5 shows a block diagram 500 of an identity attestation manager 520 that supports identity attestation using a token in accordance with aspects of the present disclosure. The identity attestation manager 520 may be an example of aspects of an identity attestation manager 420, as described herein. The identity attestation manager 520, or various components thereof, may be an example of means for performing various aspects of identity attestation using a token as described herein. For example, the identity attestation manager 520 may include a token request interface 525, a token generation component 530, a token transfer component 535, an information request interface 540, an information component 545, a user identification component 550, a request verification component 555, or any combination thereof. Each of these components may be in communication with one another (e.g., via one or more buses, communications links, communications interfaces, or any combination thereof).

The token request interface 525 may be configured as or otherwise support a means for receiving, at a self-executing program stored on a blockchain distributed data store and from a first client application associated with the self-executing program, a first request to mint an identity attestation token for a user, wherein the first request includes an indication of a wallet address for the user. The token generation component 530 may be configured as or otherwise support a means for generating the identity attestation token that is indicative of first identity information, for the user, that is stored in an off-chain data source. The token transfer component 535 may be configured as or otherwise support a means for broadcasting a message that is configured to transfer the identity attestation token to the wallet address for the user. The information request interface 540 may be configured as or otherwise support a means for receiving, at the self-executing program and from a second application, a request for the first identity information for the user, the request including an identifier for the identity attestation token. The information component 545 may be configured as or otherwise support a means for sending, to the second application after receiving the request, a second message that includes information indicative of the off-chain data source.

In some examples, the information indicative of the off-chain data source comprises an address for a second self-executing program used to request the first identity information for the user. In some examples, the information indicative of the off-chain data source comprises a uniform resource locator used to request the first identity information for the user.

In some examples, to support generating the identity attestation token, the token transfer component 535 may be configured as or otherwise support a means for generating the identity attestation token with one or more parameters that restrict transfer of the identity attestation token to another wallet address.

In some examples, to support receiving the first request, the user identification component 550 may be configured as or otherwise support a means for receiving the first request that includes an identifier for the user, wherein the generated identity attestation token includes the identifier for the user, wherein the identifier is configured to restrict transfer of the identity attestation token to another user.

In some examples, the request verification component 555 may be configured as or otherwise support a means for verifying that the first request includes a signature associated with an operator associated with the self-executing program, wherein the identity attestation token is generated and the message is broadcast after verifying that the first request includes the signature.

In some examples, to support receiving the request for the first identity information, the information request interface 540 may be configured as or otherwise support a means for receiving the request from the second application that is a second self-executing program stored on the blockchain distributed data store.

In some examples, the identity attestation token is further indicative of second identity information, for the user, that is stored in a second off-chain data source.

Figure 6:
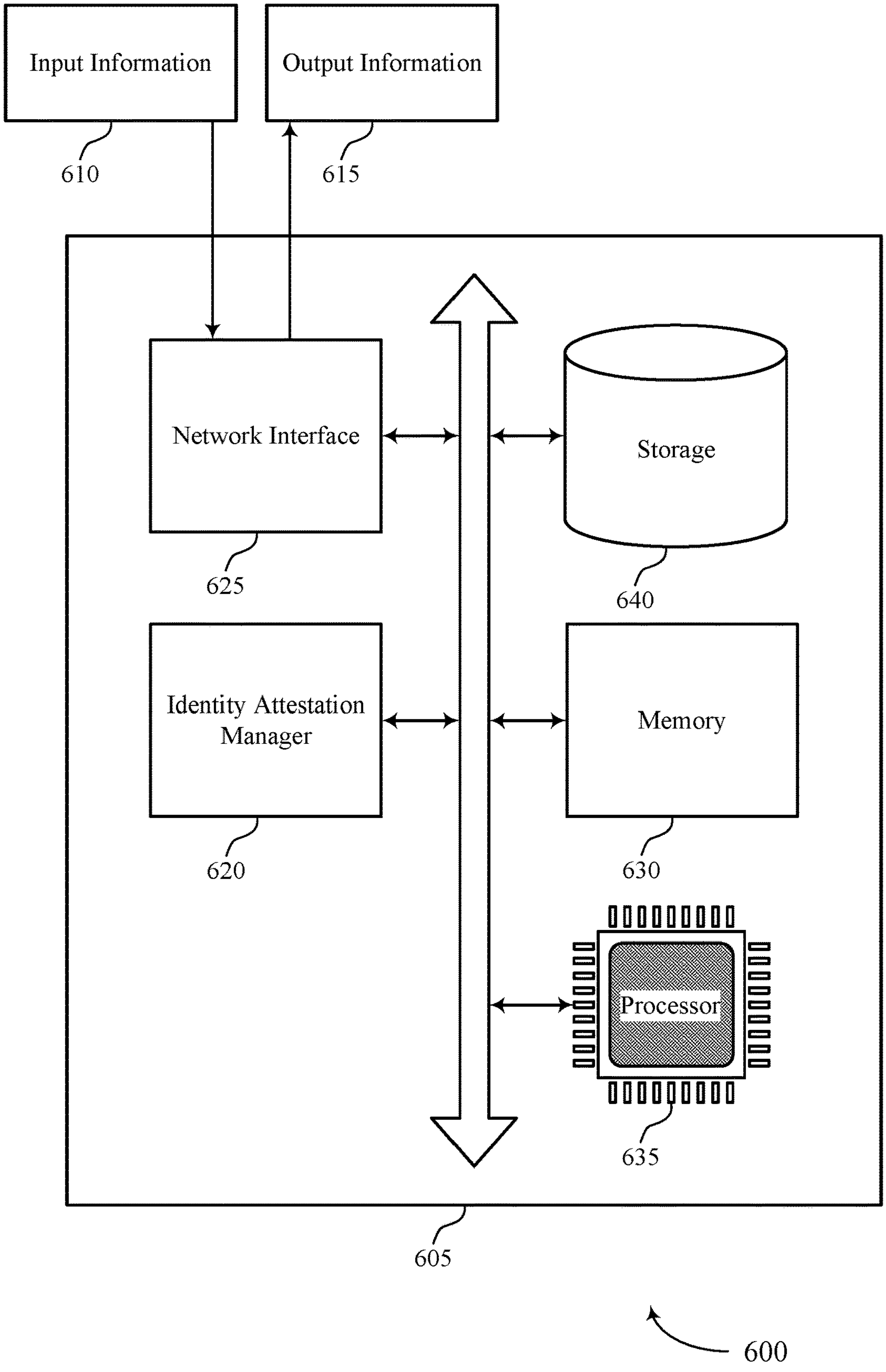
FIG. 6 shows a diagram of a system including a device that supports identity attestation using a token in accordance with aspects of the present disclosure.

FIG. 6 shows a diagram 600 including a system 605 that supports identity attestation using a token in accordance with aspects of the present disclosure. The system 605 may be an example of or include the components of a system 405 as described herein. The system 605 may include components for blockchain communication, reading, broadcasting, transaction verification, and program (e.g., self-executing program, smart contract) execution, such as an identity attestation manager 620, a network interface 625, a memory 630, a processor 635, and a storage 640. These components may be in electronic communication or otherwise coupled (e.g., operatively, communicatively, functionally, electronically, electrically). For example, each of these components may be in communication or be configured to communicate with one another (e.g., via one or more buses, communications links, communications interfaces, or any combination thereof). The system 605 may be an example of one or more servers that support a blockchain network node (e.g., a node 145 of FIG. 1).

The network interface 625 may enable the system 605 to exchange information (e.g., input information 610, output information 615, or both) with other systems or devices (not shown). For example, the network interface 625 may enable the system 605 to connect to a network (e.g., a network 135 as described herein). The network interface 625 may include one or more wireless network interfaces, one or more wired network interfaces, or any combination thereof.

Memory 630 may include RAM, ROM, or both. The memory 630 may store computer-readable, computer-executable software including instructions that, when executed, cause the processor 635 to perform various functions described herein, such as functions supporting identity attestation using a token. In some cases, the memory 630 may contain, among other things, a basic input/output system (BIOS), which may control basic hardware or software operation such as the interaction with peripheral components or devices.

The processor 635 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 635 may be configured to execute computer-readable instructions stored in a memory 630 to perform various functions (e.g., functions or tasks supporting identity attestation using a token). Though a single processor 635 is depicted in the example of FIG. 6, it is to be understood that the system 605 may include any quantity of one or more of processors 635 and that a group of processors 635 may collectively perform one or more functions ascribed herein to a processor, such as the processor 635.

Storage 640 may be configured to store data that is generated, processed, stored, or otherwise used by the system 605. In some cases, the storage 640 may include one or more HDDs, one or more SSDs, or both. In some examples, the storage 640 may be an example of a single database, a distributed database, multiple distributed databases, a data store, a data lake, or an emergency backup database For example, the identity attestation manager 620 may be configured as or otherwise support a means for receiving, at a self-executing program stored on a blockchain distributed data store and from a first client application associated with the self-executing program, a first request to mint an identity attestation token for a user, wherein the first request includes an indication of a wallet address for the user. The identity attestation manager 620 may be configured as or otherwise support a means for generating the identity attestation token that is indicative of first identity information, for the user, that is stored in an off-chain data source. The identity attestation manager 620 may be configured as or otherwise support a means for broadcasting a message that is configured to transfer the identity attestation token to the wallet address for the user. The identity attestation manager 620 may be configured as or otherwise support a means for receiving, at the self-executing program and from a second application, a request for the first identity information for the user, the request including an identifier for the identity attestation token. The identity attestation manager 620 may be configured as or otherwise support a means for sending, to the second application after receiving the request, a second message that includes information indicative of the off-chain data source.

By including or configuring the identity attestation manager 620 in accordance with examples as described herein, the system 605 may support techniques for reduced utilization of processor and memory resource, improved user experience related to coordination of user identity information, and improved security by reducing the need for transacting with user identity information.

Figure 7:
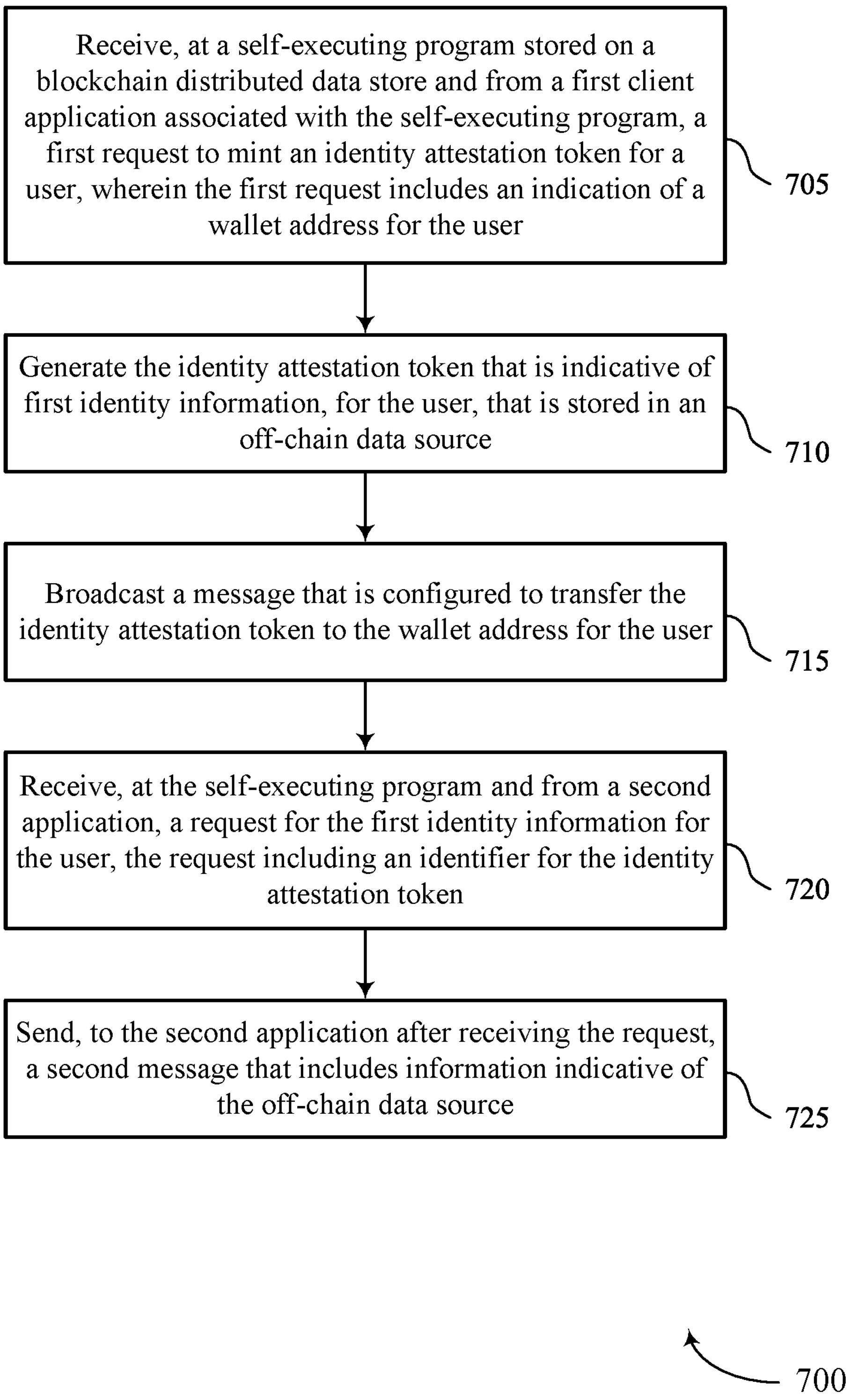
FIGS. 7 through 10 show flowcharts illustrating methods that support identity attestation using a token in accordance with aspects of the present disclosure.

FIG. 7 shows a flowchart illustrating a method 700 that supports identity attestation using a token in accordance with aspects of the present disclosure. The operations of the method 700 may be implemented by a custodial token platform or its components as described herein. For example, the operations of the method 700 may be performed by a custodial token platform as described with reference to FIGS. 1 through 6. In some examples, a custodial token platform may execute a set of instructions to control the functional elements of the wireless custodial token platform to perform the described functions. Additionally, or alternatively, the wireless custodial token platform may perform aspects of the described functions using special-purpose hardware.

At 705, the method may include receiving, at a self-executing program stored on a blockchain distributed data store and from a first client application associated with the self-executing program, a first request to mint an identity attestation token for a user, wherein the first request includes an indication of a wallet address for the user. The operations of 705 may be performed in accordance with examples as disclosed herein. In some examples, aspects of the operations of 705 may be performed by a token request interface 525 as described with reference to FIG. 5.

At 710, the method may include generating the identity attestation token that is indicative of first identity information, for the user, that is stored in an off-chain data source. The operations of 710 may be performed in accordance with examples as disclosed herein. In some examples, aspects of the operations of 710 may be performed by a token generation component 530 as described with reference to FIG. 5.

At 715, the method may include broadcasting a message that is configured to transfer the identity attestation token to the wallet address for the user. The operations of 715 may be performed in accordance with examples as disclosed herein. In some examples, aspects of the operations of 715 may be performed by a token transfer component 535 as described with reference to FIG. 5.

At 720, the method may include receiving, at the self-executing program and from a second application, a request for the first identity information for the user, the request including an identifier for the identity attestation token. The operations of 720 may be performed in accordance with examples as disclosed herein. In some examples, aspects of the operations of 720 may be performed by an information request interface 540 as described with reference to FIG. 5.

At 725, the method may include sending, to the second application after receiving the request, a second message that includes information indicative of the off-chain data source. The operations of 725 may be performed in accordance with examples as disclosed herein. In some examples, aspects of the operations of 725 may be performed by an information component 545 as described with reference to FIG. 5.

Figure 8:
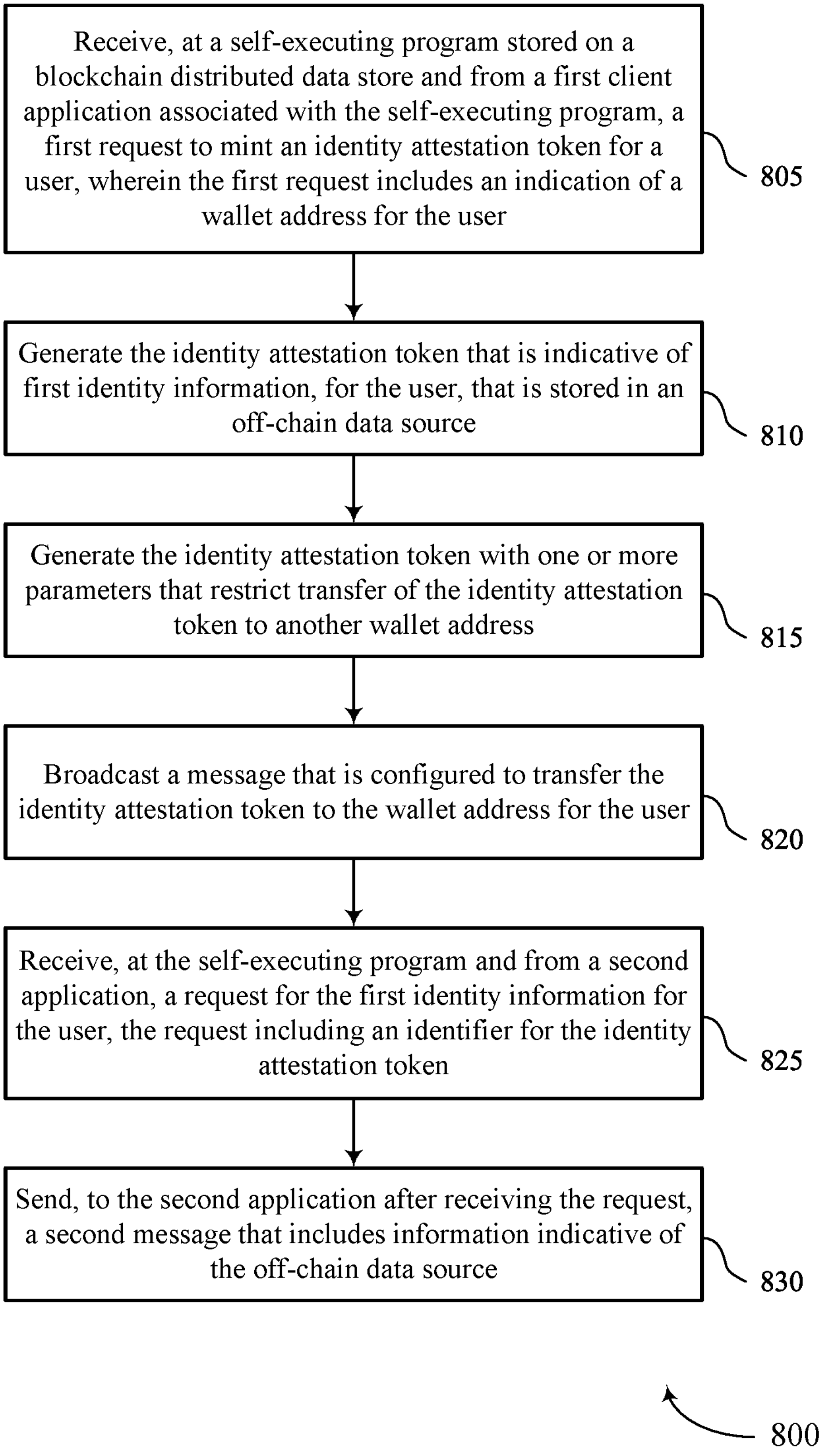

FIG. 8 shows a flowchart illustrating a method 800 that supports identity attestation using a token in accordance with aspects of the present disclosure. The operations of the method 800 may be implemented by a custodial token platform or its components as described herein. For example, the operations of the method 800 may be performed by a custodial token platform as described with reference to FIGS. 1 through 6. In some examples, a custodial token platform may execute a set of instructions to control the functional elements of the wireless custodial token platform to perform the described functions. Additionally, or alternatively, the wireless custodial token platform may perform aspects of the described functions using special-purpose hardware.

At 805, the method may include receiving, at a self-executing program stored on a blockchain distributed data store and from a first client application associated with the self-executing program, a first request to mint an identity attestation token for a user, wherein the first request includes an indication of a wallet address for the user. The operations of 805 may be performed in accordance with examples as disclosed herein. In some examples, aspects of the operations of 805 may be performed by a token request interface 525 as described with reference to FIG. 5.

At 810, the method may include generating the identity attestation token that is indicative of first identity information, for the user, that is stored in an off-chain data source. The operations of 810 may be performed in accordance with examples as disclosed herein. In some examples, aspects of the operations of 810 may be performed by a token generation component 530 as described with reference to FIG. 5.

At 815, the method may include generating the identity attestation token with one or more parameters that restrict transfer of the identity attestation token to another wallet address. The operations of 815 may be performed in accordance with examples as disclosed herein. In some examples, aspects of the operations of 815 may be performed by a token transfer component 535 as described with reference to FIG. 5.

At 820, the method may include broadcasting a message that is configured to transfer the identity attestation token to the wallet address for the user. The operations of 820 may be performed in accordance with examples as disclosed herein. In some examples, aspects of the operations of 820 may be performed by a token transfer component 535 as described with reference to FIG. 5.

At 825, the method may include receiving, at the self-executing program and from a second application, a request for the first identity information for the user, the request including an identifier for the identity attestation token. The operations of 825 may be performed in accordance with examples as disclosed herein. In some examples, aspects of the operations of 825 may be performed by an information request interface 540 as described with reference to FIG. 5.

At 830, the method may include sending, to the second application after receiving the request, a second message that includes information indicative of the off-chain data source. The operations of 830 may be performed in accordance with examples as disclosed herein. In some examples, aspects of the operations of 830 may be performed by an information component 545 as described with reference to FIG. 5.

Figure 9:
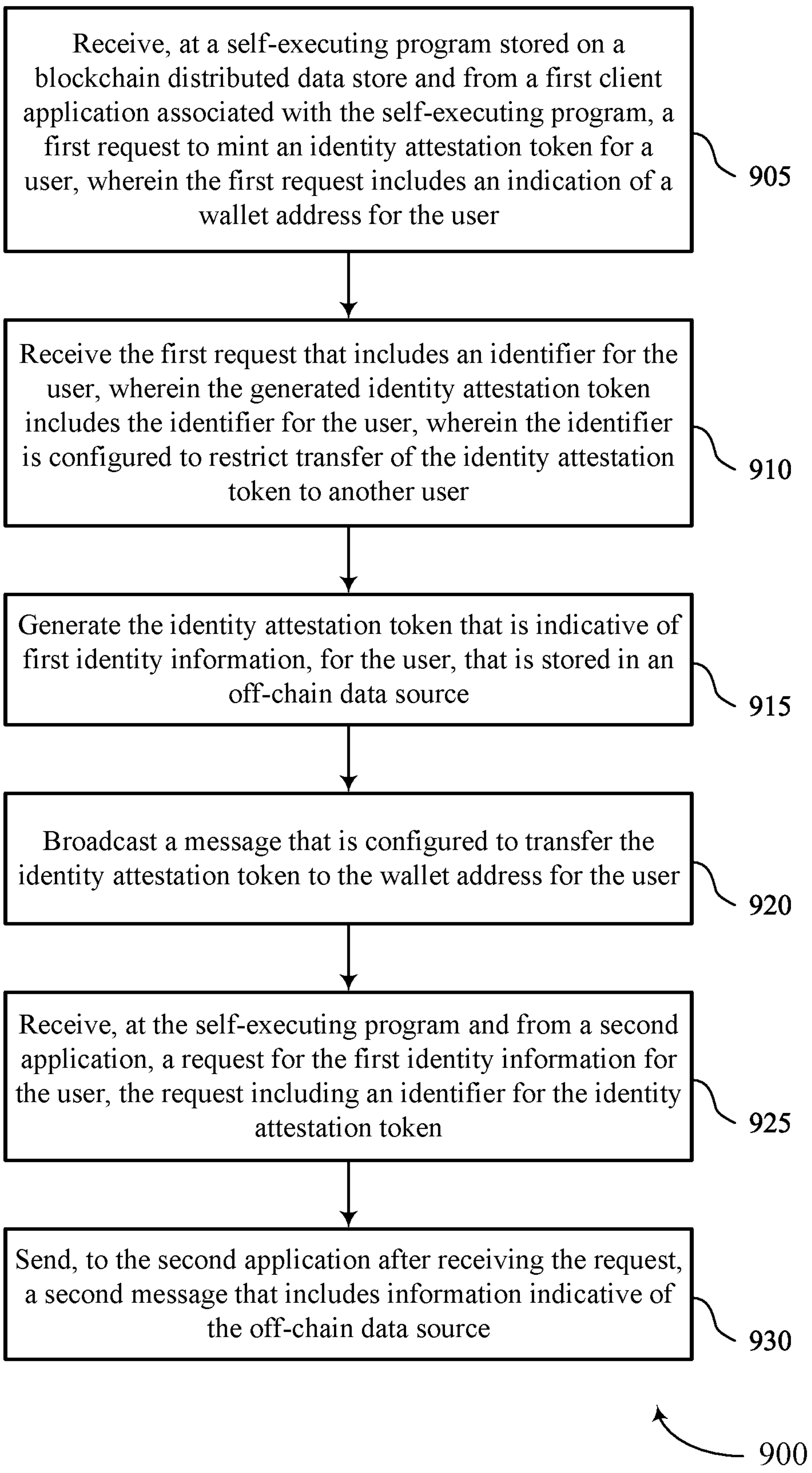

FIG. 9 shows a flowchart illustrating a method 900 that supports identity attestation using a token in accordance with aspects of the present disclosure. The operations of the method 900 may be implemented by a custodial token platform or its components as described herein. For example, the operations of the method 900 may be performed by a custodial token platform as described with reference to FIGS. 1 through 6. In some examples, a custodial token platform may execute a set of instructions to control the functional elements of the wireless custodial token platform to perform the described functions. Additionally, or alternatively, the wireless custodial token platform may perform aspects of the described functions using special-purpose hardware.

At 905, the method may include receiving, at a self-executing program stored on a blockchain distributed data store and from a first client application associated with the self-executing program, a first request to mint an identity attestation token for a user, wherein the first request includes an indication of a wallet address for the user. The operations of 905 may be performed in accordance with examples as disclosed herein. In some examples, aspects of the operations of 905 may be performed by a token request interface 525 as described with reference to FIG. 5.

At 910, the method may include receiving the first request that includes an identifier for the user, wherein the generated identity attestation token includes the identifier for the user, wherein the identifier is configured to restrict transfer of the identity attestation token to another user. The operations of 910 may be performed in accordance with examples as disclosed herein. In some examples, aspects of the operations of 910 may be performed by a user identification component 550 as described with reference to FIG. 5.

At 915, the method may include generating the identity attestation token that is indicative of first identity information, for the user, that is stored in an off-chain data source. The operations of 915 may be performed in accordance with examples as disclosed herein. In some examples, aspects of the operations of 915 may be performed by a token generation component 530 as described with reference to FIG. 5.

At 920, the method may include broadcasting a message that is configured to transfer the identity attestation token to the wallet address for the user. The operations of 920 may be performed in accordance with examples as disclosed herein. In some examples, aspects of the operations of 920 may be performed by a token transfer component 535 as described with reference to FIG. 5.

At 925, the method may include receiving, at the self-executing program and from a second application, a request for the first identity information for the user, the request including an identifier for the identity attestation token. The operations of 925 may be performed in accordance with examples as disclosed herein. In some examples, aspects of the operations of 925 may be performed by an information request interface 540 as described with reference to FIG. 5.

At 930, the method may include sending, to the second application after receiving the request, a second message that includes information indicative of the off-chain data source. The operations of 930 may be performed in accordance with examples as disclosed herein. In some examples, aspects of the operations of 930 may be performed by an information component 545 as described with reference to FIG. 5.

Figure 10:
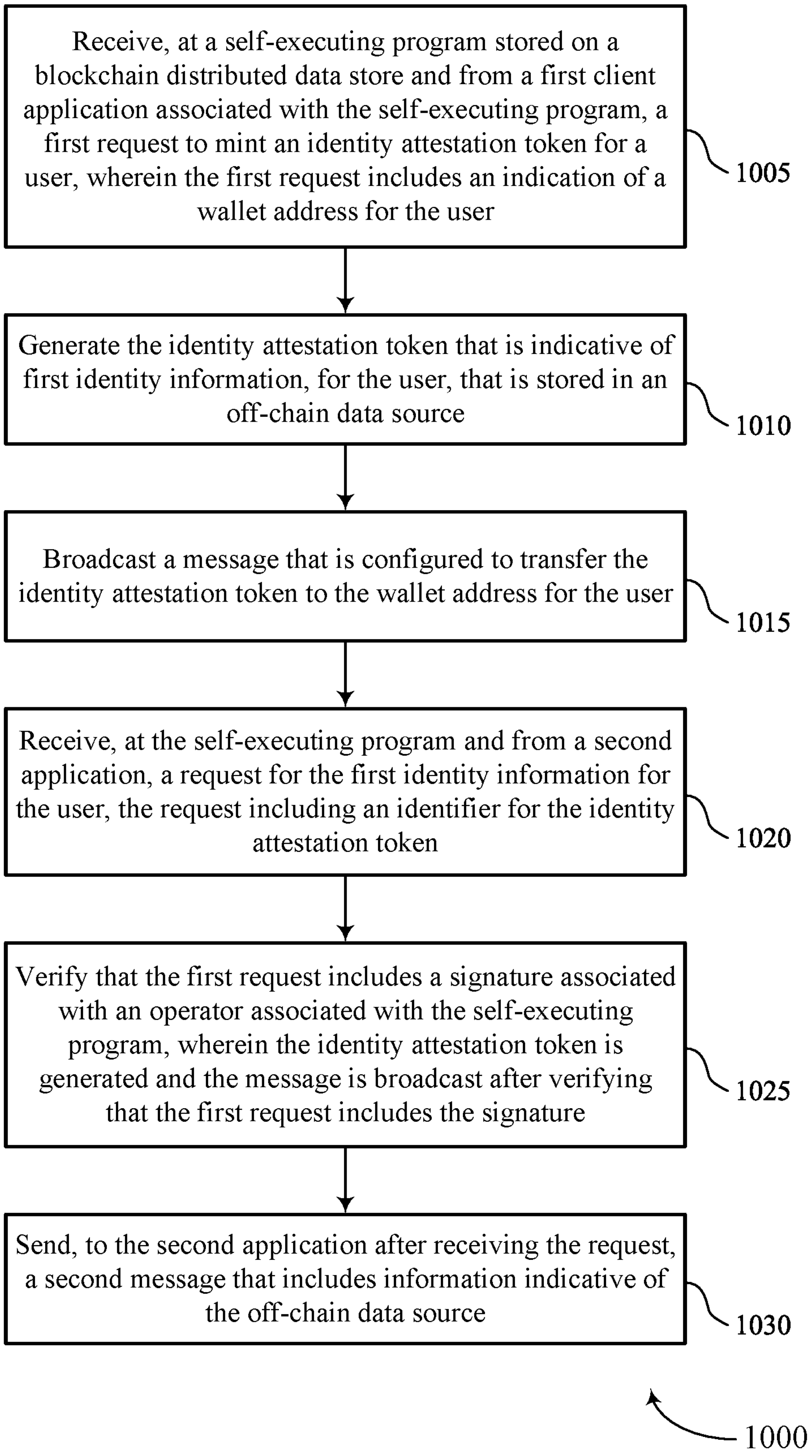

FIG. 10 shows a flowchart illustrating a method 1000 that supports identity attestation using a token in accordance with aspects of the present disclosure. The operations of the method 1000 may be implemented by a custodial token platform or its components as described herein. For example, the operations of the method 1000 may be performed by a custodial token platform as described with reference to FIGS. 1 through 6. In some examples, a custodial token platform may execute a set of instructions to control the functional elements of the wireless custodial token platform to perform the described functions. Additionally, or alternatively, the wireless custodial token platform may perform aspects of the described functions using special-purpose hardware.

At 1005, the method may include receiving, at a self-executing program stored on a blockchain distributed data store and from a first client application associated with the self-executing program, a first request to mint an identity attestation token for a user, wherein the first request includes an indication of a wallet address for the user. The operations of 1005 may be performed in accordance with examples as disclosed herein. In some examples, aspects of the operations of 1005 may be performed by a token request interface 525 as described with reference to FIG. 5.

At 1010, the method may include generating the identity attestation token that is indicative of first identity information, for the user, that is stored in an off-chain data source. The operations of 1010 may be performed in accordance with examples as disclosed herein. In some examples, aspects of the operations of 1010 may be performed by a token generation component 530 as described with reference to FIG. 5.

At 1015, the method may include broadcasting a message that is configured to transfer the identity attestation token to the wallet address for the user. The operations of 1015 may be performed in accordance with examples as disclosed herein. In some examples, aspects of the operations of 1015 may be performed by a token transfer component 535 as described with reference to FIG. 5.

At 1020, the method may include receiving, at the self-executing program and from a second application, a request for the first identity information for the user, the request including an identifier for the identity attestation token. The operations of 1020 may be performed in accordance with examples as disclosed herein. In some examples, aspects of the operations of 1020 may be performed by an information request interface 540 as described with reference to FIG. 5.

At 1025, the method may include verifying that the first request includes a signature associated with an operator associated with the self-executing program, wherein the identity attestation token is generated and the message is broadcast after verifying that the first request includes the signature. The operations of 1025 may be performed in accordance with examples as disclosed herein. In some examples, aspects of the operations of 1025 may be performed by a request verification component 555 as described with reference to FIG. 5.

At 1030, the method may include sending, to the second application after receiving the request, a second message that includes information indicative of the off-chain data source. The operations of 1030 may be performed in accordance with examples as disclosed herein. In some examples, aspects of the operations of 1030 may be performed by an information component 545 as described with reference to FIG. 5.

A method is described. The method may include receiving, at a self-executing program stored on a blockchain distributed data store and from a first client application associated with the self-executing program, a first request to mint an identity attestation token for a user, wherein the first request includes an indication of a wallet address for the user, generating the identity attestation token that is indicative of first identity information, for the user, that is stored in an off-chain data source, broadcasting a message that is configured to transfer the identity attestation token to the wallet address for the user, receiving, at the self-executing program and from a second application, a request for the first identity information for the user, the request including an identifier for the identity attestation token, and sending, to the second application after receiving the request, a second message that includes information indicative of the off-chain data source.

An apparatus is described. The apparatus may include a processor, memory coupled with the processor, and instructions stored in the memory. The instructions may be executable by the processor to cause the apparatus to receive, at a self-executing program stored on a blockchain distributed data store and from a first client application associated with the self-executing program, a first request to mint an identity attestation token for a user, wherein the first request includes an indication of a wallet address for the user, generate the identity attestation token that is indicative of first identity information, for the user, that is stored in an off-chain data source, broadcast a message that is configured to transfer the identity attestation token to the wallet address for the user, receive, at the self-executing program and from a second application, a request for the first identity information for the user, the request including an identifier for the identity attestation token, and send, to the second application after receiving the request, a second message that includes information indicative of the off-chain data source.

Another apparatus is described. The apparatus may include means for receiving, at a self-executing program stored on a blockchain distributed data store and from a first client application associated with the self-executing program, a first request to mint an identity attestation token for a user, wherein the first request includes an indication of a wallet address for the user, means for generating the identity attestation token that is indicative of first identity information, for the user, that is stored in an off-chain data source, means for broadcasting a message that is configured to transfer the identity attestation token to the wallet address for the user, means for receiving, at the self-executing program and from a second application, a request for the first identity information for the user, the request including an identifier for the identity attestation token, and means for sending, to the second application after receiving the request, a second message that includes information indicative of the off-chain data source.

A non-transitory computer-readable medium storing code is described. The code may include instructions executable by a processor to receive, at a self-executing program stored on a blockchain distributed data store and from a first client application associated with the self-executing program, a first request to mint an identity attestation token for a user, wherein the first request includes an indication of a wallet address for the user, generate the identity attestation token that is indicative of first identity information, for the user, that is stored in an off-chain data source, broadcast a message that is configured to transfer the identity attestation token to the wallet address for the user, receive, at the self-executing program and from a second application, a request for the first identity information for the user, the request including an identifier for the identity attestation token, and send, to the second application after receiving the request, a second message that includes information indicative of the off-chain data source.

In some examples of the method, apparatuses, and non-transitory computer-readable medium described herein, the information indicative of the off-chain data source comprises an address for a second self-executing program used to request the first identity information for the user.

In some examples of the method, apparatuses, and non-transitory computer-readable medium described herein, the information indicative of the off-chain data source comprises a uniform resource locator used to request the first identity information for the user.

In some examples of the method, apparatuses, and non-transitory computer-readable medium described herein, generating the identity attestation token may include operations, features, means, or instructions for generating the identity attestation token with one or more parameters that restrict transfer of the identity attestation token to another wallet address.

In some examples of the method, apparatuses, and non-transitory computer-readable medium described herein, receiving the first request may include operations, features, means, or instructions for receiving the first request that includes an identifier for the user, wherein the generated identity attestation token includes the identifier for the user, wherein the identifier may be configured to restrict transfer of the identity attestation token to another user.

Some examples of the method, apparatuses, and non-transitory computer-readable medium described herein may further include operations, features, means, or instructions for verifying that the first request includes a signature associated with an operator associated with the self-executing program, wherein the identity attestation token may be generated and the message may be broadcast after verifying that the first request includes the signature.

In some examples of the method, apparatuses, and non-transitory computer-readable medium described herein, receiving the request for the first identity information may include operations, features, means, or instructions for receiving the request from the second application that may be a second self-executing program stored on the blockchain distributed data store.

In some examples of the method, apparatuses, and non-transitory computer-readable medium described herein, the identity attestation token may be further indicative of second identity information, for the user, that may be stored in a second off-chain data source.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary." used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method of identity attestation, comprising:

receiving, via a blockchain network that supports a blockchain distributed data store, at a self-executing program stored on the blockchain distributed data store, and from a first client application associated with the self-executing program, a first request to mint a non-fungible identity attestation token for a user, wherein the first request includes an indication of a wallet address on the blockchain distributed data store for the user, a first signature associated with an operator that manages the self-executing program, and a second signature associated with a blockchain wallet of the user;

verifying the first signature using a public key of the operator configured at the self-executing program and the second signature using a public key of the blockchain wallet of the user;

generating, in accordance with verifying the first signature and the second signature, the non-fungible identity attestation token that includes on-chain metadata stored on the blockchain distributed data store, the on-chain metadata indicative of first identity information, for the user, that is stored in an off-chain data source separate from the blockchain distributed data store, wherein the non-fungible identity attestation token indicates an address of the self-executing program and wherein the first identity information comprises a superset of the on-chain metadata;

broadcasting, via the blockchain network, a message that transfers the non-fungible identity attestation token to the wallet address for the user, wherein broadcasting the message attributes ownership of the non-fungible identity attestation token to the wallet address on the blockchain distributed data store;

receiving, at the self-executing program and from a second application different from the first client application and based at least in part on the non-fungible identity attestation token indicating the address of the self-executing program stored on the blockchain distributed data store, a second request to obtain the first identity information for the user, the second request including a function call to the self-executing program and an identifier for the non-fungible identity attestation token; and sending, to the second application after receiving the second request and based at least in part on receiving the function call and the identifier for the non-fungible identity attestation token, a second message that includes information indicative of the off-chain data source, wherein the information allows the second application to access the first identity information in the off-chain data source.

2. The method of claim 1, wherein the information indicative of the off-chain data source comprises an address for a second self-executing program used to request the first identity information for the user.

3. The method of claim 1, wherein the information indicative of the off-chain data source comprises a uniform resource locator used to request the first identity information for the user.

4. The method of claim 1, wherein generating the non-fungible identity attestation token comprises:

generating the non-fungible identity attestation token with one or more parameters that restrict transfer of the non-fungible identity attestation token to another wallet address.

5. The method of claim 1, wherein receiving the first request comprises:

receiving the first request that includes an identifier for the user, wherein the generated non-fungible identity attestation token includes the identifier for the user, wherein the identifier restricts transfer of the non-fungible identity attestation token to another user.

6. The method of claim 1, wherein receiving the second request to obtain the first identity information comprises:

receiving the second request from the second application that is a second self-executing program stored on the blockchain distributed data store.

7. The method of claim 1, wherein the non-fungible identity attestation token is further indicative of second identity information, for the user, that is stored in a second off-chain data source.

8. An apparatus, comprising:

one or more processors;

memory coupled with the one or more processors; and instructions stored in the memory and executable by the one or more processors to cause the apparatus to:

receive, via a blockchain network that supports a blockchain distributed data store, at a self-executing program stored on the blockchain distributed data store, and from a first client application associated with the self-executing program, a first request to mint a non-fungible identity attestation token for a user, wherein the first request includes an indication of a wallet address on the blockchain distributed data store for the user, a first signature associated with an operator that manages the self-executing program, and a second signature associated with a blockchain wallet of the user;

verify the first signature using a public key of the operator configured at the self-executing program and the second signature using a public key of the blockchain wallet of the user;

generate, in accordance with verifying the first signature and the second signature, the non-fungible identity attestation token that includes on-chain metadata stored on the blockchain distributed data store, the on-chain metadata indicative of first identity information, for the user, that is stored in an off-chain data source separate from the blockchain distributed data store, wherein the non-fungible identity attestation token indicates an address of the self-executing program and wherein the first identity information comprises a superset of the on-chain metadata;

broadcast, via the blockchain network, a message that transfers the non-fungible identity attestation token to the wallet address for the user, wherein broadcasting the message attributes ownership of the non-fungible identity attestation token to the wallet address on the blockchain distributed data store;

receive, at the self-executing program and from a second application different from the first client application and based at least in part on the non-fungible identity attestation token indicating the address of the self-executing program stored on the blockchain distributed data store, a second request to obtain the first identity information for the user, the second request including a function call to the self-executing program and an identifier for the non-fungible identity attestation token; and send, to the second application after receiving the second request and based at least in part on receiving the function call and the identifier for the non-fungible identity attestation token, a second message that includes information indicative of the off-chain data source, wherein the information allows the second application to access the first identity information in the off-chain data source.

9. The apparatus of claim 8, wherein the information indicative of the off-chain data source comprises an address for a second self-executing program used to request the first identity information for the user.

10. The apparatus of claim 8, wherein the information indicative of the off-chain data source comprises a uniform resource locator used to request the first identity information for the user.

11. The apparatus of claim 8, wherein the instructions to generate the non-fungible identity attestation token are executable by the one or more processors to cause the apparatus to:

generate the non-fungible identity attestation token with one or more parameters that restrict transfer of the non-fungible identity attestation token to another wallet address.

12. The apparatus of claim 8, wherein the instructions to receive the first request are executable by the one or more processors to cause the apparatus to:

receive the first request that includes an identifier for the user, wherein the generated non-fungible identity attestation token includes the identifier for the user, wherein the identifier restricts transfer of the non-fungible identity attestation token to another user.

13. A non-transitory computer-readable medium storing code, the code comprising instructions executable by one or more processors to:

receive, via a blockchain network that supports a blockchain distributed data store, at a self-executing program stored on the blockchain distributed data store, and from a first client application associated with the self-executing program, a first request to mint a non-fungible identity attestation token for a user, wherein the first request includes an indication of a wallet address on the blockchain distributed data store for the user, a first signature associated with an operator that manages the self-executing program, and a second signature associated with a blockchain wallet of the user;

verify the first signature using a public key of the operator configured at the self-executing program and the second signature using a public key of the blockchain wallet of the user;

generate, in accordance with verifying the first signature and the second signature, the non-fungible identity attestation token that includes on-chain metadata stored on the blockchain distributed data store, the on-chain metadata indicative of first identity information, for the user, that is stored in an off-chain data source separate from the blockchain distributed data store, wherein the non-fungible identity attestation token indicates an address of the self-executing program and wherein the first identity information comprises a superset of the on-chain metadata;

broadcast, via the blockchain network, a message that transfers the non-fungible identity attestation token to the wallet address for the user, wherein broadcasting the message attributes ownership of the non-fungible identity attestation token to the wallet address on the blockchain distributed data store;

receive, at the self-executing program and from a second application different from the first client application and based at least in part on the non-fungible identity attestation token indicating the address of the self-executing program stored on the blockchain distributed data store, a second request to obtain the first identity information for the user, the second request including a function call to the self-executing program and an identifier for the non-fungible identity attestation token; and send, to the second application after receiving the second request and based at least in part on receiving the function call and the identifier for the non-fungible identity attestation token, a second message that includes information indicative of the off-chain data source, wherein the information allows the second application to access the first identity information in the off-chain data source.

14. The non-transitory computer-readable medium of claim 13, wherein the information indicative of the off-chain data source comprises an address for a second self-executing program used to request the first identity information for the user.

15. The non-transitory computer-readable medium of claim 13, wherein the information indicative of the off-chain data source comprises a uniform resource locator used to request the first identity information for the user.

16. The non-transitory computer-readable medium of claim 13, wherein the instructions to generate the non-fungible identity attestation token are executable by the one or more processors to:

generate the non-fungible identity attestation token with one or more parameters that restrict transfer of the non-fungible identity attestation token to another wallet address.

17. The non-transitory computer-readable medium of claim 13, wherein the instructions to receive the first request are executable by the one or more processors to:

receive the first request that includes an identifier for the user, wherein the generated non-fungible identity attestation token includes the identifier for the user, wherein the identifier restricts transfer of the non-fungible identity attestation token to another user.

* * * * *